(12) United States Patent
Ai et al.

(10) Patent No.: US 6,964,627 B2
(45) Date of Patent: *Nov. 15, 2005

(54) OUTPUT-SPLIT AND COMPOUND-SPLIT INFINITELY VARIABLE TRANSMISSION

(75) Inventors: Xiaolan Ai, Massillon, OH (US); Terry W. Mohr, Canton, OH (US)

(73) Assignee: The Timken Company, Canton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/394,531

(22) Filed: Mar. 21, 2003

(65) Prior Publication Data

US 2003/0186769 A1 Oct. 2, 2003

Related U.S. Application Data

(60) Provisional application No. 60/367,913, filed on Mar. 26, 2002.

(51) Int. Cl.$^7$ ................................................. F16H 3/72
(52) U.S. Cl. ........................................................ 475/5
(58) Field of Search ................................................ 475/5

(56) References Cited

U.S. PATENT DOCUMENTS

| | | |
|---|---|---|
| 3,982,448 A | 9/1976 | Polak et al. |
| 5,558,588 A | 9/1996 | Schmidt |
| 5,577,973 A | 11/1996 | Schmidt |
| 5,931,757 A * | 8/1999 | Schmidt .................... 475/2 |
| 6,090,005 A | 7/2000 | Schmidt et al. |
| 6,478,705 B1 | 11/2002 | Holmes et al. |
| 2004/0043856 A1 | 3/2004 | Xiaolan |

FOREIGN PATENT DOCUMENTS

| | | |
|---|---|---|
| EP | 1247679 A2 | 9/2002 |
| WO | 03035421 A1 | 1/2003 |

OTHER PUBLICATIONS

Copy of International Search Report—Jul. 22, 2003.

* cited by examiner

*Primary Examiner*—Dirk Wright
(74) *Attorney, Agent, or Firm*—Polster, Lieder, Woodruff & Lucchesi, L.C.

(57) ABSTRACT

A transmission includes two planetary units (U1, U2) and two variators (V1, V2), all connected together such that power can be transferred between an input (I) and an output (O) in a compound-split mode or an output-split mode. In the compound-split mode the two planetary units are joined together at two connections, creating two compound member branches and two single member branches. Except when the transmission operates at its nodes, power transfers through a mechanical path and also through a variator path located in part between the two variators, one of which functions as a motor and the other as the source of power for the motor. At the nodes all power transfers through the mechanical path and the transmission has its greatest efficiency. In the output-split mode, which exists at an output speed below that identified with the first node, one of the compound member branches is interrupted so that the two planetary units are only coupled at one of the compound member branches. In this mode some of the power transfers through the first planetary unit, and some transfers through the variators and the second planetary unit.

14 Claims, 8 Drawing Sheets

S1R2(V1) − C1C2(O) − R1(I) − S2(V2)

S1R2(V1) - C1C2(O) - R1(I) - S2(V2)

S1R2(O) - C1C2(V1) - R1(V2) - S2(I)

OUTPUT-SPLIT AND COMPOUND-SPLIT INFINITELY VARIABLE TRANSMISSION

CROSS-REFERENCE TO RELATED APPLICATIONS

This application derives priority from U.S. provisional application No. 60/367,913, filed Mar. 26, 2002, and entitled "Output/Compound Split Infinitely Variable Transmission."

STATEMENT REGARDING FEDERALLY SPONSORED RESEARCH OR DEVELOPMENT

Not Applicable.

BACKGROUND OF THE INVENTION

This invention relates in general to transmissions for transmitting rotary motion and, more particularly, to an output split and compound split infinitely variable transmission.

The primary function of a transmission in an automotive vehicle is to convert the speed and torque of an engine or prime mover into the speed and torque required by the specific requirements of the vehicle. In general it is desirable for this power transmission to occur with minimal power loss; that is, at high transmission efficiency. To optimize the overall power train efficiency, specifically the engine-transmission combination, it is also desirable to minimize or to eliminate drive-line torque interruptions as well as engine speed excursions while delivering the desired speed and torque.

Transmissions can be broadly categorized as "step-less" or "stepwise", according to the way that the final desired speed ratio is achieved. A stepwise transmission has a fixed number of speed ratios that are sequentially selected to achieve the final desired ratio. Therefore, it is not always possible to use the maximum available engine power, because engine speed and load vary as the transmission moves through its limited number of fixed ratios. Moving from one ratio to another is sometimes termed "shifting" in transmission design descriptions, and is often associated with unfavorable torque interruptions. Such interruptions offset overall drive-line efficiency and detract from driving comfort. Moreover, for some applications, such as agricultural and construction vehicles, an output torque interruption is extremely undesirable, more so than a momentary loss of efficiency. Such inherent shortcomings, associated with shifting, are minimized to some extent in more recent designs that incorporate pre-shifting and clutching to reduce torque interruptions. To reduce engine speed and torque variations, modem transmissions use a greater number of selectable ratios.

In principle, a stepwise transmission cannot achieve the overall vehicle efficiency of a step-less transmission which offers an infinite number of speed ratios. With a step-less transmission, there is the option to operate the engine at its optimum efficiency or lowest emission point at all times while the vehicle is moving to its desired speed at a desired power level.

Step-less transmissions can be further classified into continuously variable transmissions (CVTs) and infinitely variable transmissions (IVTs). A continuously variable transmissions, usually mechanical, provides continuously variable speed ratios over the designed speed range of the vehicle. A launch-clutch and engine-disconnect device is often required in this type of transmission for vehicle start-up, as well as a separate gear for reverse operation. In addition, most of the CVT designs transmit torque through contacting friction surfaces and are not suitable for high-torque and high-power applications.

The infinitely variable transmission, by definition, is capable of providing infinitely selectable (output-to-input) speed ratios from reverse, thru zero, to a wide range of forward speeds. No launching device is required for an IVT. In theory, the engine can be directly connected to the transmission at all times, because a zero output-to-input speed ratio or an infinite input-to-output speed ratio exists.

Historically, there were two types of IVTs that have had success in the marketplace; the hydrostatic transmission and the hydro-mechanical transmission. Hydrostatic transmissions provide a hydrostatic power path in which the input power is transformed into hydraulic power by a pump. The hydraulic power is then converted back to mechanical power by a hydraulic motor. Speed regulation of the hydraulic motor provides control of the desired vehicle speed. However, hydrostatic transmissions are very inefficient, particularly under partial load and slow speeds, and are often noisy. They are primarily used for applications where flexibility and speed-control are more important than efficiency.

The hydro-mechanical transmission concept significantly improved efficiency by providing a mechanical power path in addition to the hydrostatic power path, the mechanical path being the most efficient. This concept is known as power-split. Thus, the hydro-mechanical transmission using the power-split concept offers much improved efficiency compared to a hydrostatic transmission.

The power-split concept has been recently extended to include electric power paths rather than hydraulic paths to create electromechanical power-split systems. In an electro-mechanical transmission, the variators are electrical machines, namely motor-generators, rather than hydraulic machines. The advantages of using motor-generators rather than pumps and hydro-motors include system design flexibility, controllability, and improved performance in terms of a wider range of speed, better efficiency, and reduced operating noise.

When the speed ration goes beyond a certain range, the power in the electric path can actually exceed several times the power that is transmitted through the transmission. This phenomenon is known as internal power circulation. It wastes power, generating unwanted heat within the transmission.

BRIEF SUMMARY OF THE INVENTION

The present invention resides in a transmission having two planetary units and two variators, all connected together such that power is transferred between an input and an output in a compound split mode. With a clutch, the transmission is reconfigured to transfer power in an output split mode, thus, extending the speed ratio range and avoiding internal power circulation. The invention also resides on the process employed by the transmission to transfer power.

DETAILED DESCRIPTION OF THE INVENTION

Figure 1:
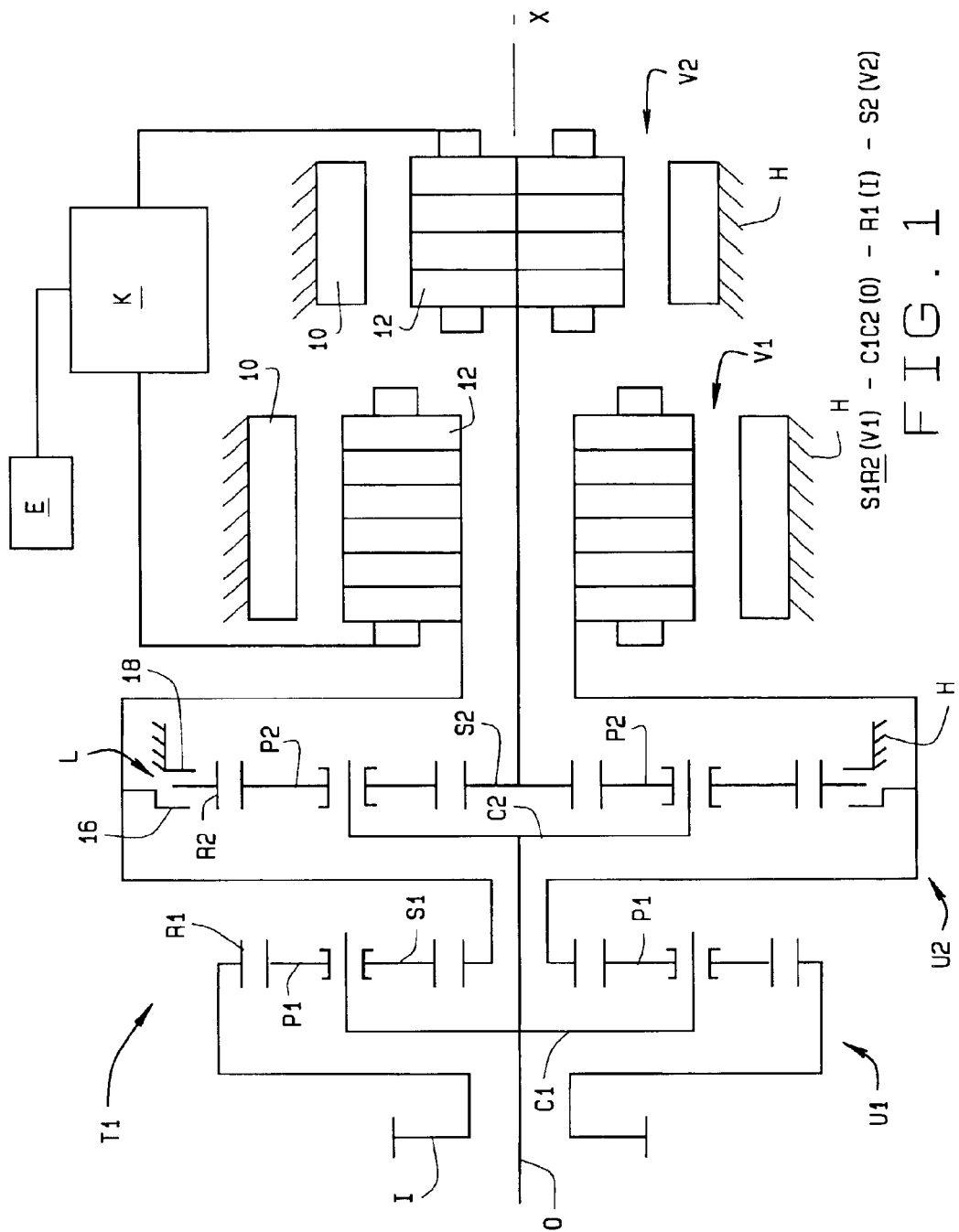
FIG. 1 is a schematic view of a transmission constructed in accordance with and embodying the present invention, with the transmission having electric variators.

A transmission T (FIG. 1) having infinite speed ratios operates in two modes —namely, an output-split mode and a compound-split mode—depending on several factors including output speed and power demands. To this end, the transmission T in each of its modes transfers power through two paths—specifically, through a purely mechanical path and through a variator path. The mechanical path in and of itself provides no basis for varying the speed ratio of the transmission T. The variator path does that for both modes of operation. Thus, the transmission T operates on a power split principle. When in the output-split mode, the transmission T has its greatest input-to-output ratio, that is to say its lowest output speeds. While the transfer of power occurs generally through both the mechanical path and the variator path, as the output speed increases, the transfer of power comes to a point or node during which all of the transfer occurs in the mechanical path. When in the compound split mode the transfer of power occurs through a somewhat different mechanical path and the variator path, except at two points or nodes when the transfer occurs purely through the mechanical path—one a low speed node and the other a high speed node. The low speed node for compound-split mode corresponds with the single node for the output-split mode. The transition between modes occurs at the low speed node without interruption in torque and is otherwise imperceptible. Thus, the transmission T offers the advantages of both a compound-split transmission, which is basically high efficiency between its node points, and an output-split transmission, which is basically high efficiency at high input speeds and low output speeds.

While the power-split, infinite variable transmission T can assume anyone of several configurations, each configuration has the following components:

1. two planetary units U1 and U2
2. two variators V1 and V2
3. a transition device L
4. an external coupling in the form of a input I
5. another external coupling in the form of an output O
6. a control unit K
7. a housing H It may also have an energy storage device E.

Each planetary unit U includes a sun member S, a ring member R located around the sun member S, at least one and more likely more planets P located between the sun member S and the ring member R, and a carrier member C coupled with the planets P and providing axes about which the planets P rotate. Thus, each planetary unit U1 and U2 has three concentric members, namely its sun member S, its ring member R, and its carrier member C. Typically, the sun member S, the ring member R and the planets P are gears which mesh, although there may be traction rollers which transfer power purely through friction contacts without any mechanical interlock as in gear systems. The two planetary units U1 and U2 are contained within the housing H where they are organized about a common axis X. The unit U1 has a sun member S1, a ring member R1, planets P1, and a carrier member C1. Likewise, the unit U2 has sun member S2, a ring member R2, planets P2, and a carrier member C2.

When the transmission T operates in its compound-split mode, the two planetary units U1 and U2 are compounded. In particular, one of the three concentric members of the unit U1 is connected to the one of the three concentric members of the unit U2, and another of the three members of the unit U1 is connected to another of the three members of the unit U2, thus forming two compound member branches and leaving two single member branches. For example, (FIG. 1), the two carrier members C1 and C2 may be joined to form one compound member branch and the sun member S1 may be joined to the ring member R2 to form another compound member branch. This leaves the ring member R1 and the sun member S2 as the single member branches. One of the compound member branches is connected to one of the variators V and the other to the output O. In the example, the compound member branch formed by the sun member S1 and ring member R2 is connected to the variator V1, whereas the other compound member branch formed by the coupled carrier members C1 and C2 is connected to the output O. One of the single member branches is connected to the input I and the other to the other variator V2. In the example, the ring member R1 is connected to the input I and the sun member S2 is connected to the variator V2.

Turning now to the variators V, each has the capacity to deliver (generate) power and receive (consume) power. They are connected together so that when the variator V1 generates power, the variator V2 may consume the power so generated, and conversely, when the variator V2 generates power, the variator V1 may consume the power generated. Typically and preferably each variator V is an electrical machine capable of serving both as a generator and a motor. When so constructed, each variator V includes a stator 10 that is mounted on the housing H and a rotor 12 that revolves in the housing H. The two variators V1 and V2 are connected together through an electrical conductor 14. On the other hand, each variator V may take the form of a hydraulic pump-motor.

The transition device L includes a clutch 16 and a brake 18. The clutch 16 has the capacity to sever or interrupt one of the compound member branches, thus disconnecting the member of the unit U1 that is in that branch from the member of the unit U2 that is in the branch. The brake 18 retards rotation of one of the disconnected members by preferably clamping it to the housing H, or in other words, "grounding" that disconnected member. When the clutch 16 is disengaged and the brake 18 applied, the transmission T operates in its output split mode, and conversely when the transmission T operates in its compound split mode the clutch 16 is engaged and the brake 18 is released.

The input I may be a simple shaft, a gear, a pulley, a sprocket, or some other type of coupling. The same holds true for the output O.

The control unit K controls the power transferred between the variators V1 and V2. It may transfer all of the power or modulate it. It may also transfer power to the energy storage device E, when the device E is present. The energy storage device E may take the form of an accumulator, a capacitor, a battery pack or a mechanical device such as a flywheel. It can release power to the control device K for transfer to one of the variators V.

Figure 2:
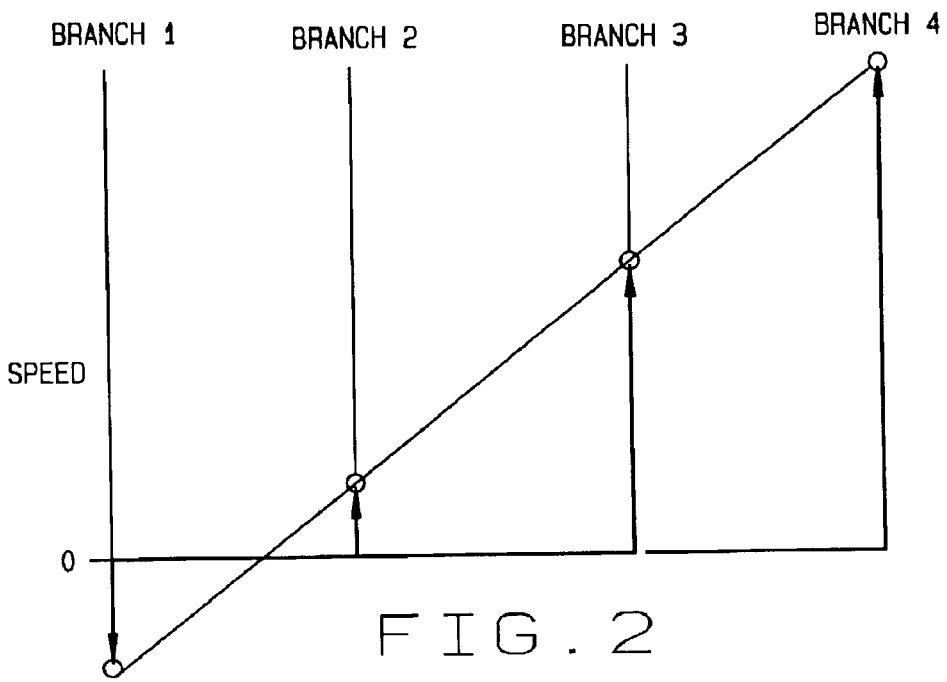
FIG. 2 is a vectorial representation of the speeds of the several branches in the transmission.

When the transmission T operates in its compound split mode, each of the four branches—that is, the two compound member branches and the two single member branches—rotates at a different velocity, and a correlation exists between those velocities. The correlation is best considered vectorially—indeed, on a vectorial depiction (FIG. 2) with the vectors representing the angular velocity of the four branches in ascending order. The vectorial depictions vary according to the configuration of the transmission, but irrespective of configuration, the compound branches are always together or else at the ends. The vectorial depiction may assume one of the following orders:

Compound—compound—single—single

Single—compound—compound—single

Single—single—compound—compound

Compound—single—single—compound

The correlation extends further to the variators V and the input I and output O as well. The arrangement of those components on a vectorial depiction will vary, depending on the configuration of the transmission, but irrespective of the configuration the branches containing the two variators V are always together or at the ends, and the branches containing the input I and output O are always together or at the ends. The vectorial depictions for the variators V and the input I and output O may be one of the following:

Variator—variator—input(or output)—output(or input)

Input(or output)—variator—variator—output(or input)

Input(or output) output(or input)—variator—variator

Variator—input(or output)—output(or input)—variator

Transmission configurations representing the foregoing concepts may of course be represented by schematic illustrations, but they may also be represented alphanumerically as follows:

S1S2(V1)-C1C2(O)-R1(I)-R2(V2)

S1S2(O)-C1C2(V1)-R1(V2)-R2(I)

R1R2(V1)-C1C2(O)-(S1(I)-S2(V2)

R1R2(O)-C1C2(V1)-S1(V2)-S2(I)

S1R2(V1)-C1C2(O)-R1(I)-S2(V2)

S1R2(O)-C1C2(V1)-R1(V2)-S2(I)

S1S2(O)-C1(I)-C2(V2)-R1R2(V1)

S1S2(V1)-C1(V2)-C2(I)-R1R2(O)

S1R2(O)-C1(I)-C2(V2)-R1S2(V1)

S1R2(V1)-C1(V2)-C2(I)-R1S2(O)

S1(I)-C1S2(O)-R1C2(V1)-R2(V2)

S1(V2)-C1S2(V1)-C1S2(O)-R2(I)

S1(I)-C1R2(O)-R1C2(V1)-S2(V2)

R1(I)-C1S2(O)-S1C2(V1)-R2(V2)

other variations are possible, but the foregoing represents the most important ones.

In the foregoing alphanumeric representations, the letters S,R and C designate a sun member 8, a ring member R, and a carrier member C, respectivly, whereas the numerals immediately following those letters designate the planetary unit U1 or U2 of which the member is a component. Likewise, V1 and V2 identify the two variators V. The letters I and O designate the input I and output O, respectively. The combination of two or three letters isolated by dashes (--) represent components that are connected together, at least during the compound mode of operation. Thus, C1S2(O) represents the carrier member C1, the sun number S2 and the output O all joined together. Any two of the letters S, R, or C isolated in such a combination identity a compound member branch. When any one of the letters S, R, and C appears in a combination without the other two, the combination constitutes a single member branch. Whether the branch is compound or single member, list to which the branch is connected is enclosed within parthesis. Thus, C1S2(O) indicates that the compound member branch C1S2 is connected to the output O, whereas S1(I) indicates that the single member branch composed of the sun member S1 is connected to the input I. Finally, any letters and numerals in italics in a compound member branch indicates that the member italicized is connected through the clutch 16 to the other member of the branch and to whatever else is joined to the branch and may be grounded by the brake 18. In other words, the two planetary units U1 and U2 which are joined together at the two members represented by the letters S. R, or C in the combination are separable at the member represented by the underlined alphanumeric designation. Thus, S1R2(V1) indicates a compound member branch in which the sun member S1 and the variator V1 are joined permanently and are further coupled to the ring member R2 through the clutch 16, so that the ring member R2 may be disconnected from the sun number S1 and variator V1 which remain connected. Moreover, the ring member R2 may be grounded by the brake 18.

Considering in more detail the transmission T1 (FIG. 1) represented by the alphanumeric designation S1R2(V1)-C1C2(O) -R1(I)-S2(V2). It has two planetary units U1 and U2 organized along a common axis X. The unit U1 has a sun member S1, and ring member R1, located around the sun member S1 and planets P1 located between and engaged with the sun and ring members S1 and R1. The planets P1 rotate about axes that lie parallel to the axis X and indeed are established by a carrier member C1 which itself rotates about the axis X. The planetary unit U2 has a sun member S2, a ring member R2, planets P2, and a carrier C2 arranged in a like manner. The sun member S1 is coupled to the ring member R2, forming compound member branch S1R2, and this branch is further coupled to a variator V1. Moreover, the ring member R2 is capable of being disconnected from and reconnected to the sun member S1 and the variator V1 at the clutch 16 to sever the composite member branch S1R2. The ring member R2 may also be grounded by the brake 18. The combination of the sun member S1, ring member R2, and variator V1 thus carries the designation S1R2(V1).

The carriers C1 and C2 for the two planetary units U1 and U2 are connected together forming another compound member branch C1C2 and are further connected to the output O. Thus the designation C1C2(O).

Next comes the ring gear R1 of the first planetary unit U1 which forms one of the two single member branches. It is connected to the input I, with which it rotates about the axis X, to form the combination R1(I).

Finally, the sun member S2 of the planetary unit U2, is coupled to the variator V2 and the two likewise rotate about the axis X. The sun member S2 represents the other single member branch and together with the variator V2 responds to the designation S2(V2).

The two planetary units U1 and U2 and the variators V1 and V2 are enclosed within a housing H and bearings mounted on the housing H support at least the output O and input I and establish the axis X of rotation. The variators V1 and V2 each constitute electric motor-generators in the sense that each is capable of producing electrical power when rotated by torque applied to it, and also exerting torque when electrical energy is delivered to it. Like any electrical motor-generator, each has a stator 10 and a rotor 12. The two stators 10 are mounted in fixed positions on the housing H at locations where their respective rotors 12 may revolve within them. The rotor 12 for the variator V1 is permanently coupled to the sun gear S1, so that the two will revolve in unison about the axis X. The rotor 12 for the variator V2 is connected to the sun member S2, so that they will revolve in unison about the axis X. The two variators V1 and V2 are electrically connected through a conductor 14, so that electrical power transfers from the variator V1 when it functions as a generator to the variator V2 which may then serve as a motor, or vice versa. The actual amount of power transferred depends on several factors including the torque applied to the variator V which serves as a motor and also the speed at which its rotor 12 revolves and also by the control unit K which has the capacity to modulate the power passing from the one variator V to the other. The control unit K also has the capacity to divert power to an energy storage device E or admit power from the device E when the device E is present.

In order to separate the two planetary units U1 and U2 at the compound branch formed by the sun member S1 and the ring member R2, that compound member branch is fitted with a transition device L including a clutch 16 and a brake 18. The clutch 16, when engaged, couples the ring member R2 to the sun member S1 and disconnects the two when disengaged. The brake 18, when applied, holds the ring member R2 fast with respect to the housing H so that the ring member R2 does not rotate. When the clutch 16 is engaged, the brake 18 should be released, so that the sun member S1 and the ring member R2 and the rotor 12 of the variator V1 as well, can all rotate in unison about the axis X. However, when the brake 18 is applied, the clutch 16 should be disengaged, so that the sun member S1 and rotor 12 of the variator V1 can rotate relative to and independently of the ring member R2.

The transmission T1 perhaps finds its greatest utility in an automotive vehicle for delivering power from the engine for the vehicle to the driven road wheels of the vehicle. To propel the vehicle from a stop to highway speeds, the transmission T1 initially delivers torque while operating in the output-split mode and then after the vehicle reaches a moderate speed transitions to the compound split mode, with the transition being at the first or low speed node. While operating in the compound-split mode, the transmission may pass through the high speed node and continue to operate beyond that node. The operation of the transmission T1 in its two modes may be represented graphically on Cartesian coordinates (FIGS. 3–6 where dotted lines designated the output-split mode and solid lines the compound-split mode).

To prepare the transmission T1 for low speed operation in the output-split mode, the clutch 16 is disengaged and the brake 18 is applied. This immobilizes the ring member R2 so that it will not rotate, yet leaves the sun member S1 and rotor 12 of the variator V1 free to rotate in unison and at the same angular velocity. In that sense, it separates the planetary units U1 and U2 at one of its compound member branches. But in another sense the units U1 and U2 are coupled at the carriers C1 and C2 which are the other compound member branch.

Figure 3:
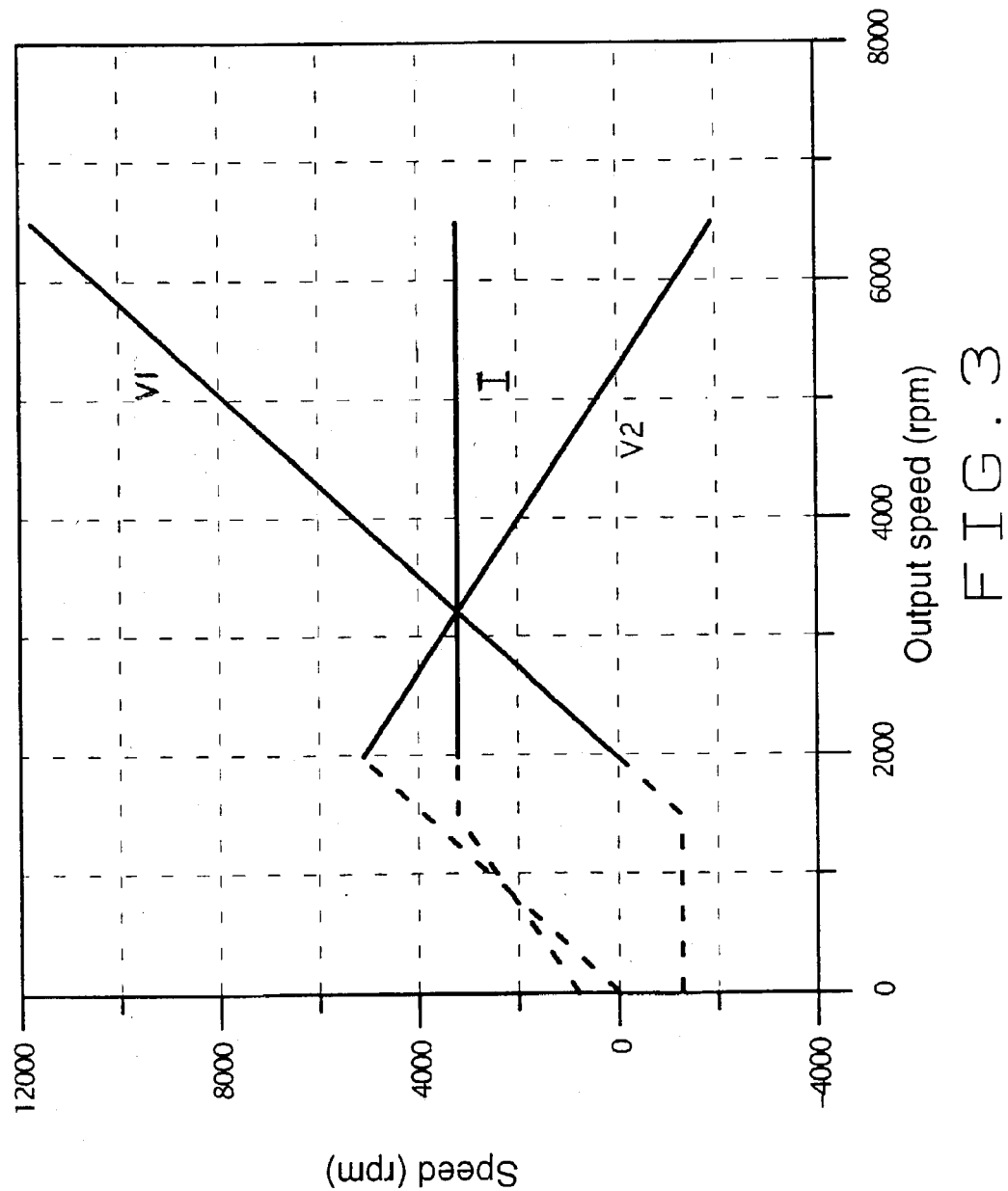
FIG. 3 is a graph showing the output speed of the transmission with the speeds of the input and each of the variators.
Figure 4:
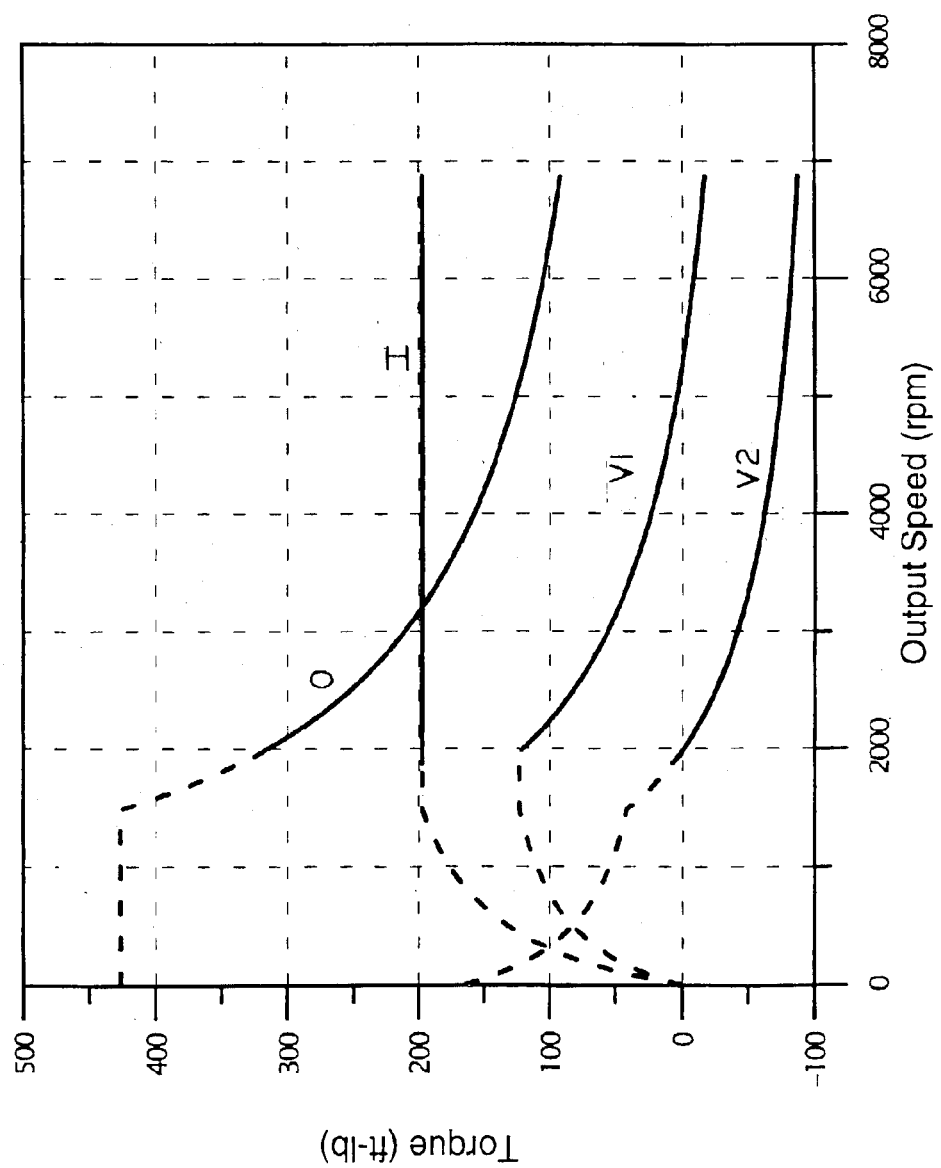
FIG. 4 is a graph showing the output speed of the transmission with the torques in the input and output and also at each of the variators as functions of the output speed of the transmission.

Assuming that the vehicle is at rest with its engine running at idle, the output O remains at rest while the input I rotates at a relatively low angular velocity (FIG. 3). The variator V2, being coupled through the planetary unit U2 to the output O, likewise remains at rest. The input I turns the ring member R1. It rotates the planets P1 which in turn rotate the sun member S1, but the planets P1, other than turning, remain in the same position between the ring and sun members R1 and S1 inasmuch as the carrier member C1, which establishes the axes about which the planets P1 rotate, does not itself rotate. The rotor 12 of the variator V1, being connected to the sun member S1, rotates with the sun member S1. The stationary variator V2 provides the sole source of driving torque for the vehicle and indeed a measure of torque is applied to it by the idling variator V1 (FIG. 4). So the variator V2 experiences a torque reaction from the vehicle, but the variator V1 essentially free wheels with the sun member S1. The stationary variator V2 in essence consumes no power, nor does the fee-wheeling variator V1.

As the torque of the engine and the input I increases, and with it the torque and speed as well so does the speed of the sun member S1 and the rotor 12 of the variator V1 to which the sun member S1 is connected. The variator V1 generates enough power to overcome the reaction torque of the variator V2 and the rotor 12 of the variator V2 begins to turn (FIG. 3). In other words, the variator V1 becomes a generator and the variator V2 becomes a motor powered by the variator V1. The sun member S2, of course, rotates with the rotor 12 of the variator V2. The planetary unit U2 functions as a speed reducer for the motor-variator V2 and delivers power produced by the variator 2 to the output O through its carrier member C2. Power also flows to the output O through the carrier member C1 of the planetary unit U1, it providing a purely mechanical path from the input I to the output O.

Figure 5:
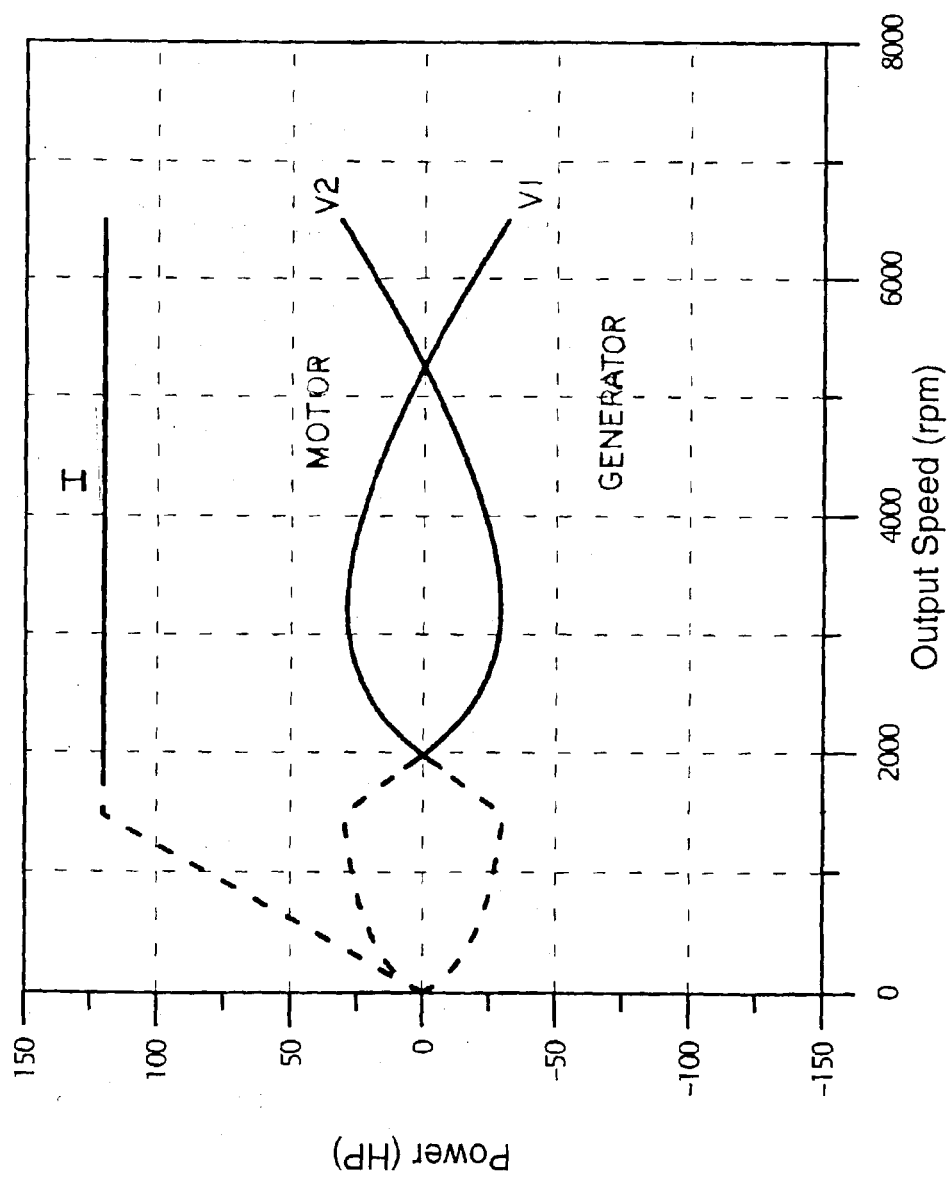
FIG. 5 is a graph showing the power furnished by the input and the power transferred through the variators as functions of the output speed of the transmission.
Figure 6:
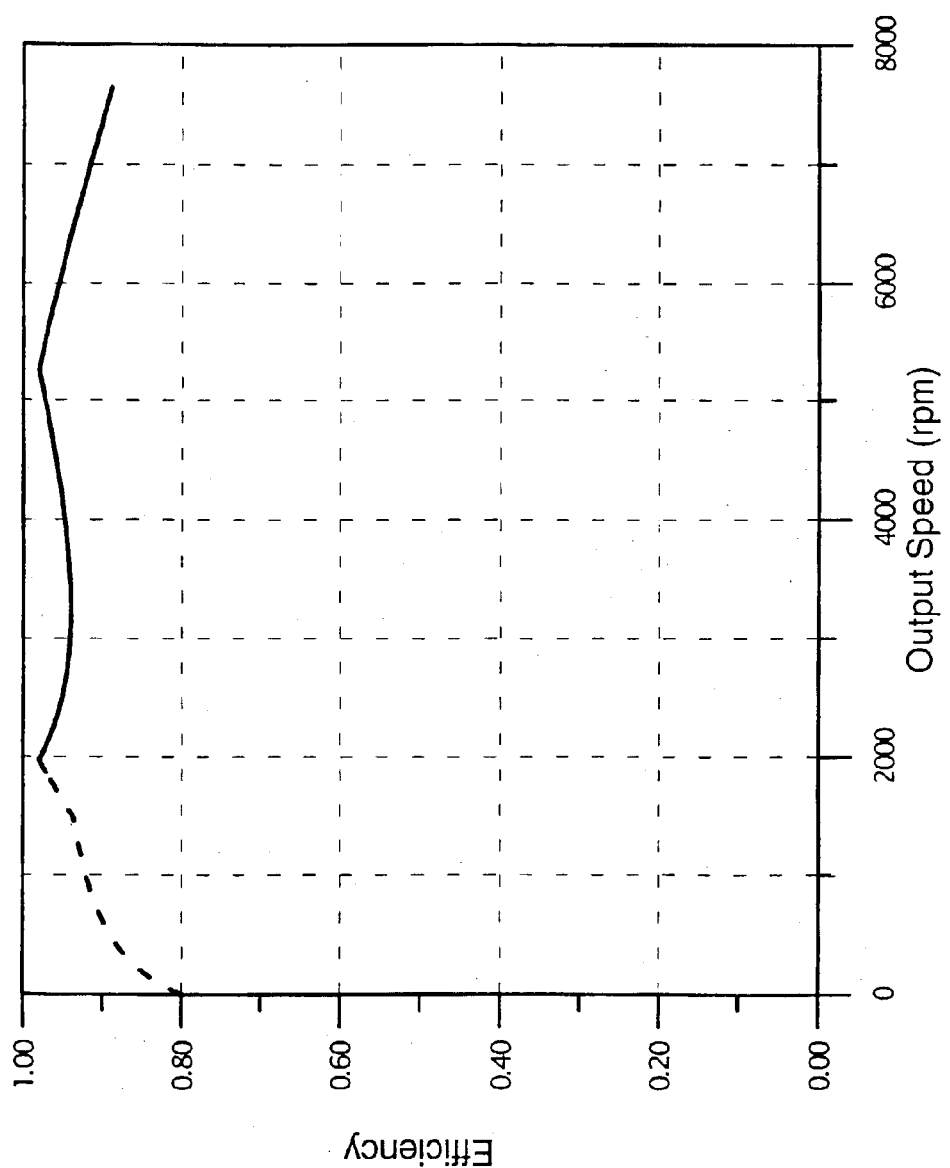
FIG. 6 is a graph showing the output speed of the transmission with the efficiency of the transmission as a function of the output speed of the transmission.

While the clutch 16 remains disengaged and the brake 18 is applied, the transmission T1 operates in an output-split mode. For most of this mode the speed of the variator V1, which is the generator, may remain constant, but it does decrease near the end of the mode (FIG. 3). The speed of the variator V2, on the other hand, continues to increase. The torque on the variator V1 increases, while the torque on the variator V2 decreases (FIG. 4). The power generated by the variator V1 is essentially the power consumed by the variator V2 (FIG. 5). If none is diverted or admitted at the control unit K they are equal and opposite, and while the power generated increases during the output-split mode, it reaches a point where it begins to decrease. The variator V2 follows it, consuming the power that the variator V1 generates. Eventually that power at the variators V diminishes to zero. This represents the first node where all power transfers through the mechanical path and none through the variator path.

At the first node the brake 18 of the transfer unit L is released, while the clutch 16 is engaged. This frees the ring member R2 from the housing H so it can rotate and further connects the ring member R2 with the sun member S1. The two rotate in unison as a compound member branch. This marks the beginning of the compound-split mode.

At the first node, the variator V2 changes from a motor to a generator, whereas the variator V1 changes from a generator to a motor (FIG. 5). The speed range for the output O between the first node and the second node represents the moderate and high speed operational range for the transmission T1. In this range the variator V2 functions as a generator and the variator V1 as a motor. While some of the power delivered to the output O transfers through the variator path represented by the variators V1 and V2 and the conductor 14, considerably more transfers through a mechanical path represented by the planetary units U1 and U2 which are coupled at the two compound member branches.

The speed of the input I, which is coupled to an engine, may remain generally constant during the compound split mode (FIG. 3)—indeed, constant at the optimum speed for the engine. As the speed of the output O increases the speed of the variator V1 increases with it while the speed for the variator V2 decreases. The torque on the variator V1 diminishes, while the torque on the variator V2 increases in the opposite direction.

As the speed of the output O approaches the second node the power generated by the variator V2 and the power consumed by the generator V1 diminish and become zero at the second node (FIG. 5). Going beyond the second node, the variator V2 reverses direction (FIG. 3), whereas the speed of the variator V1 continues to increase.

The efficiency of the transmission remains high between the two nodes during the compound split mode (FIG. 6), but diminishes after the second node. Moreover, the efficiency in the compound-split mode generally exceeds that in the output-split mode.

Figure 7:
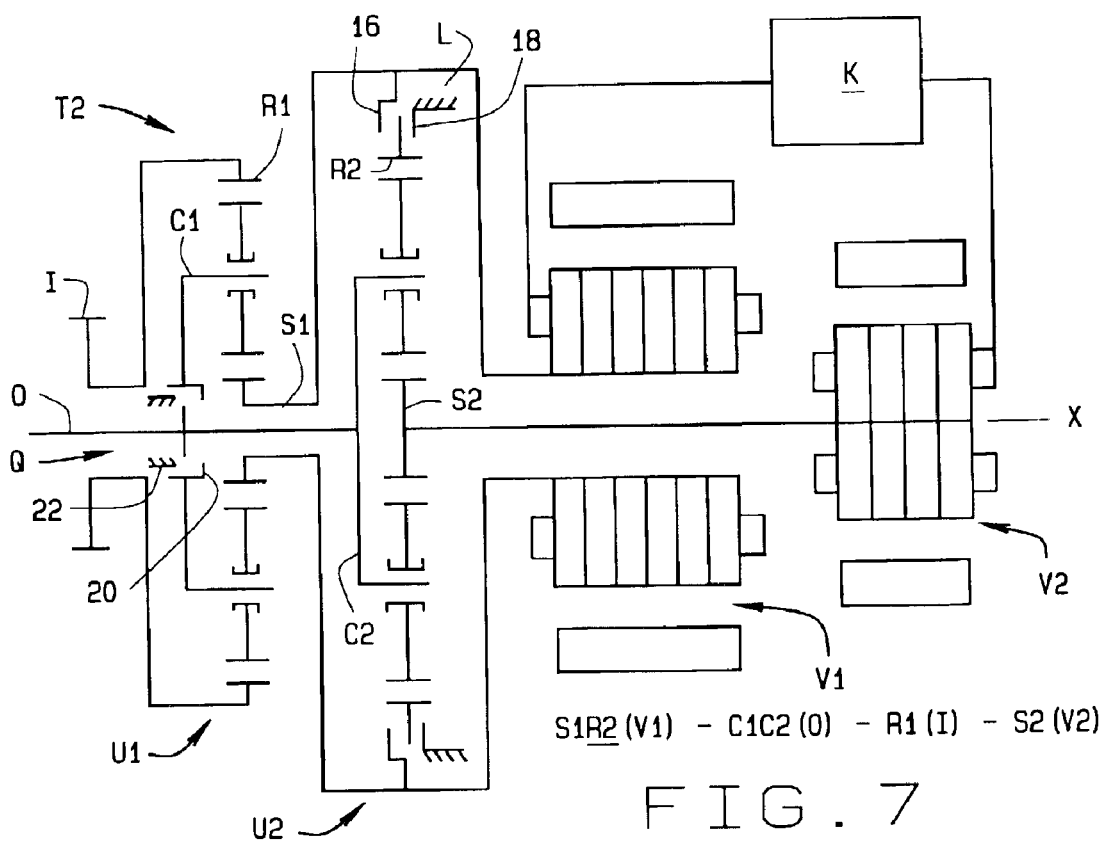
FIG. 7 is a schematic view of a modified transmission similar to the transmission of FIG. 1, but further including components for park and reverse.

To avoid internal power circulation, it is desirable to operate the transmission T1 in only one direction of rotation, that is to say when the direction of rotation for the input I remains unchanged, the direction of rotation for the output O does not change. A modified transmission T2 (FIG. 7) has the capacity to immobilize the output O and also to reverse the direction of the output O even though the input I continues to rotate in one direction—and the reverse operation occurs without internal power circulation. The transmission T2 is the same as the transmission T1 except for the presence of a park-reverse pack Q, which includes another clutch 20 and another brake 22. The clutch 20 engages and disengages the carrier C1 from the output O, while brake 22, when applied, clamps the carrier C1 to the housing H.

To prevent rotation of the output O while the input I revolves, the clutch 20 is engaged and the brake 22 applied. The brake 22 together with the clutch 20 grounds the output O to the housing H, thereby preventing rotation of the output O. In short, the transmission T2 is in park. And when the transmission T2 is in park, the variators V1 and V2 free wheel, that is to say, they are switched off.

To reverse the direction of the output O, the brake 22 is again applied and the clutch 20 disengaged. This disconnects the carrier C1 from the output O, while at the same time preventing rotation of the carrier C1. Meanwhile, the brake 18 is applied and the clutch 16 is disengaged. This grounds the ring member R2 to the housing H, while leaving the sun member S1 and rotor 12 of the variator V1 free to rotate. With the transmission T2 so configured, the transmission operates in a so-called "series hybrid" mode in which the planetary unit U1 rotates the planets P1 about the stationary carrier C1, and the planets P1 rotate the sun member S1 which is coupled directly to the rotor 12 of the variator V1. The variator V1 functions as a generator and powers the variator V2 which turns the sun member S2. The other planetary unit U2 acts as a speed reducer between the variator V2 and the output O, in that the sun member S2 rotates the planets P2 which crawl around the stationary ring member R2 and carry the carrier C2 with them. Being connected directly to the output O, the carrier C2 rotates the output O in the direction opposite to that at which the output O normally operates, with all of the power, passing through the variator path.

Figure 8:
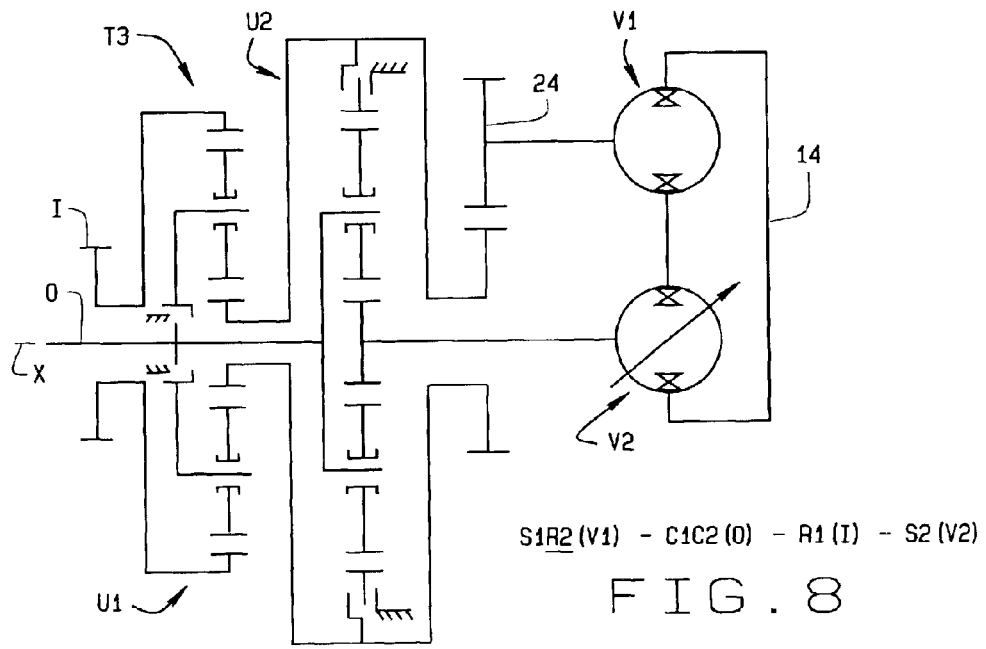
FIG. 8 is a schematic view of a modified transmission similar to the transmission of FIG. 7, but having hydraulic variators instead of electric variators.

Another modified transmission T3 (FIG. 8) is similar to the transmission T2 except that its variators V1 and V2 take the form of hydraulic devices, each capable of functioning as both a pump and a motor. The variator V1 is connected to the sun member S1 though a step up member 24.

Figure 9:
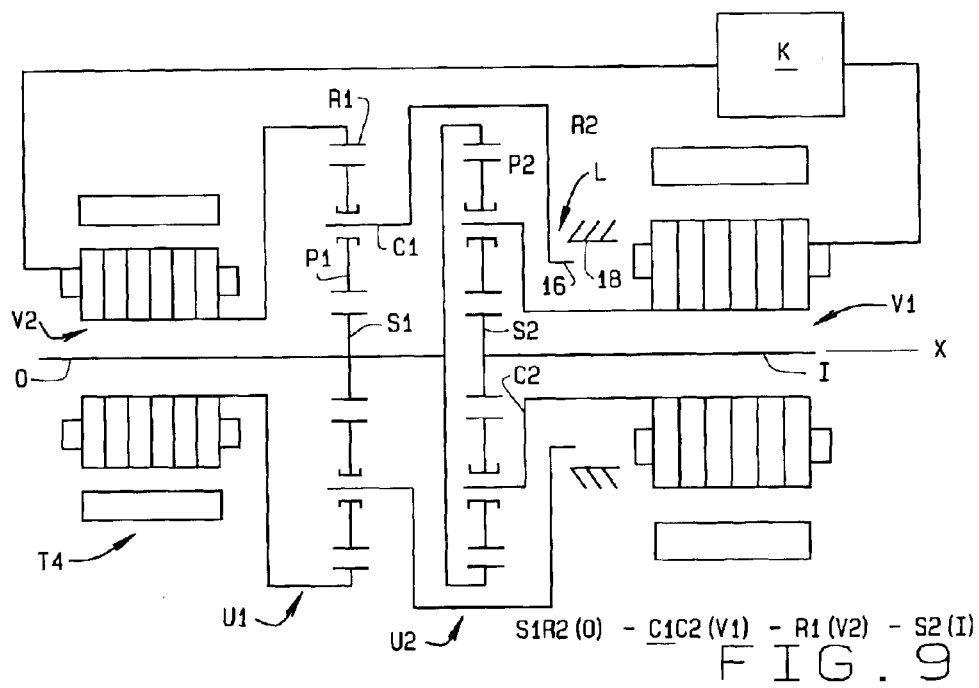
FIG. 9 is a schematic view of another modified transmission having electric variators.

Another modified transmission T4 (FIG. 9) possesses the configuration S1R2(O)—C1C2(V1)—R1(V2)—S2(I). In the transmission T4, the two planetary units U1 and U2 are compounded at their carriers C1 and C2 and also at the sun member S1 and the ring member R2. In order to transition between the output-split mode and the compound spit mode, the transfer unit L has its clutch 16 located between the two carriers C1 and C2 and its brake 18 between the carrier C1 and the housing H.

Figure 10:
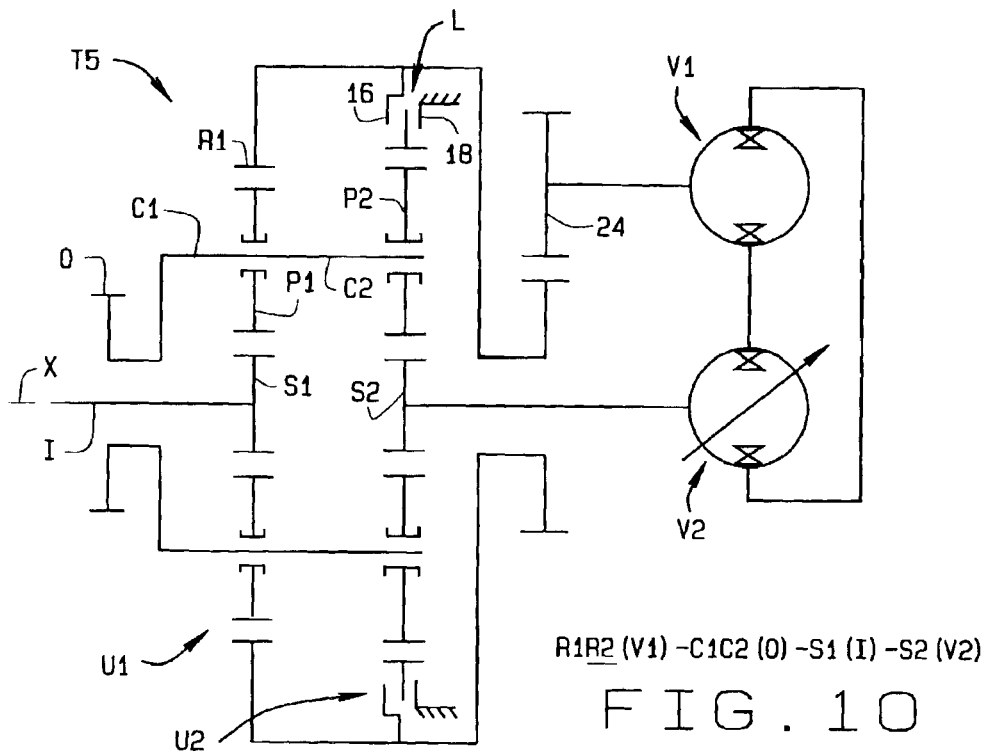
FIG. 10 is a schematic view of still another modified transmission having hydraulic variators.

Still another modified transmission T5 (FIG. 10) utilizes the configuration R1R2(V1)—C1C2(O)—S1(I)—S2(V). As such, its planetary units U1 and U2 are compounded at the ring members R1 and R2 and also at the carriers C1 and C2. The clutch 16 engages and disengages the two ring members R1 and R2, whereas the brake 18 has the capacity to clamp the ring member R2 to the housing H and thus render it stationary. The variators V1 and V2 take the form of hydraulic devices, each capable of functioning as both a pump and a motor.

Figure 11:
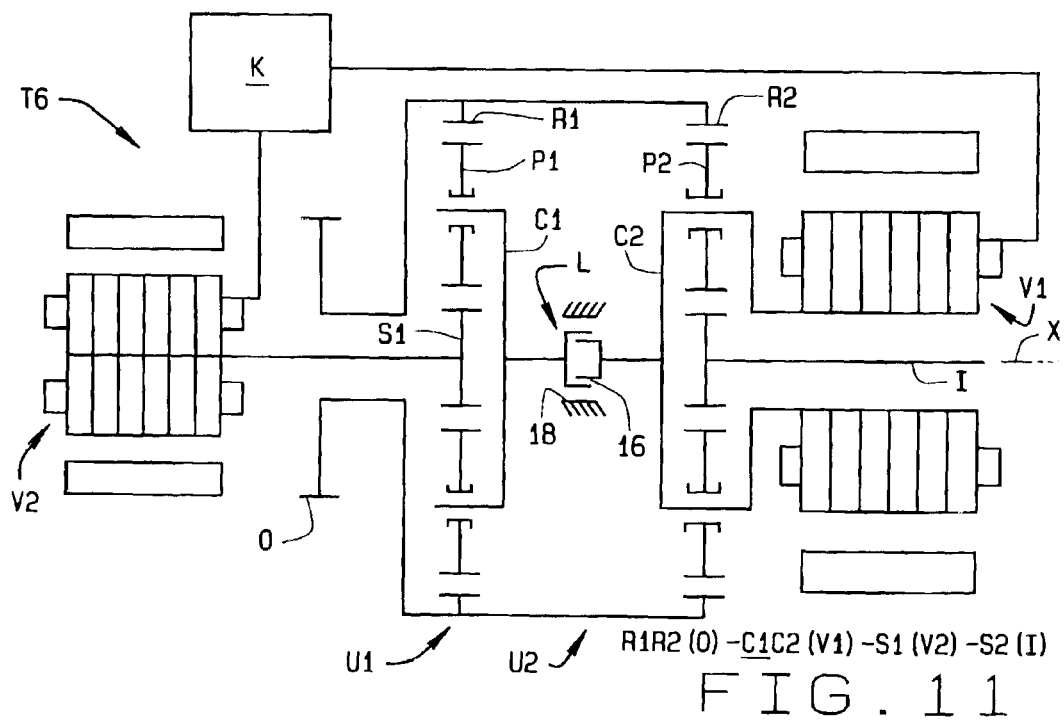
FIG. 11 is a schematic view of yet another modified transmission having electric variators.

Yet another modified transmission T6 (FIG. 11) assumes the configuration R1R2(O)—C1C2(V1)—S1(V2)—S2(I). Its planetary units U1 and U2 are compounded through their ring members R1 and R2 and also through the carriers C1 and C2. But the clutch 16 can disconnect the carriers C1 and C2 and the brake 18 can ground the carrier C1, so that the transmission T6 will operate in the output-split mode.

In each of the transmissions T infinite speed ratios exists without a significant sacrifice in efficiency, particularly at normal driving speeds. The transmissions T capture the high efficiency of each of the two modes in which they operate. Despite the two modes, the transmissions T transition between the modes without an interruption in torque and speed or other perceptible indication.

What is claimed is:

1. A transmission comprising:
    first and second planetary units, each having a sun member, a ring member located around the sun member, planets located between the sun and ring members, and a carrier member coupled with the planets and providing axes about which the planets may rotate, one of the members of the first until being connected to one of the members of the second unit to form a first compound member branch, another of the members of the first unit being engagable with another of the members of the second unit to form a second compound branch, thus leaving the remaining member of the first unit to form a single member branch and the remaining member of the second unit to form a second single member branch;
    first and second variators connected such that power can transfer between them, one of the variators being connected to one of the compound member branches and the other variator being connected to one of the single member branches;
    an input at which power is introduced into the transmission, the input being connected to the other of the single member branches;
    an output at which power is delivered from the transmission, the output being connected to the other of the compound member branches;
    a first clutch for disconnecting the members of the second compound branch, and for further disconnecting one of the member's of the second compound branch from the variator for that branch;

a first brake for retarding rotation of that one member of the second compound branch that is disconnected from the variator for that branch;

whereby the transmission operates in a compound-split mode having a low speed node at which no power transfers to or from the first and second variators when the members of the second compound branch are connected, and in an output-split mode when the members of the second compound branch are disconnected; and a second clutch for disconnecting a member of the first planetary unit from the output and a second brake for retarding rotation of that member when disconnected;

all such that all of the power delivered to the output is transferred through the variators and transmission operates in a series hybrid mode in which the output rotates in the direction opposite to that in which it would otherwise rotate.

2. A transmission according to claim 1 wherein the first and second planetary units are organized about a common axis.

3. A transmission according to claim 1 and further comprising a control device interposed between the two variators for controlling the amount of power delivered to and received from each variator.

4. A transmission according to claim 1 wherein each variator has the capacity to operate as an electrical generator and an electrical motor.

5. A transmission according to claim 1 wherein the transmission transitions between compound-split mode at the low speed node.

6. A transmission comprising:

first and second planetary units, each having a sun member, a ring member located around the sun member, planets located between the sun and ring members, and a carrier member coupled with the planets and providing axes about which the planets may rotate, one of the members of the of the first unit being connected to one of the members of the second unit to form a first compound member branch, another of the members of the first unit being engagable with another of the members of the second unit to form a second compound branch, thus leaving the remaining member of the first unit to form a single member branch and the remaining member of the second unit to form a second single member branch;

first and second variators connected such that power can transfer between them, one of the variators being connected to one of the compound member branches and the other variator being connected to one of the single member branches;

an input at which power is introduced into the transmission, the input being connected to the other of the single member branches;

an output which power is delivered from the transmission, the output being connected to the other of the compound member branch; and a first clutch for disconnecting one of the members of the second compound branch from the other member of that branch, which other member is in the second planetary unit, and from the variator of that branch;

whereby the transmission may operate in a compound-split mode when the members of the second compound branch are connected and in an output-split mode when the members of the second compound branch are disconnected;

a brake for retarding rotation of the other member of the second compound branch when the first clutch disconnects the members of that branch; and a second clutch and brake for disconnecting a member of the first planetary unit from the output and retarding rotation of that member, all such that all of the power delivered to the output is transferred through the variators and the transmission operates in a series hybrid mode in which the output rotates in the direction opposite to that in which it would otherwise rotate.

7. A process for transmitting power between a rotary input and a rotary output which are connected together through first and second planetary units, each having a sun member, a ring member, planets, and a carrier member, and also through first and second variators which themselves are connected, said process comprising:

at elevated speeds for the output;

coupling the first and second planetary units so that two compound member branches exist;

transmitting some of the power through the two planetary units in a mechanical path;

transmitting some of the power through the variators in a variator path, except at lower and upper nodes where all of the power is transferred through the mechanical path;

all such that the transmission of power is in a compound-spit mode;

at lesser speeds below the lower node;

interrupting one of the compound member branches;

transmitting some of the power through the first planetary unit;

transmitting some of the power through the connected variators and the second planetary unit;

all such that the transmission of power is in an output-split mode;

and alternatively, in reverse:

transferring all of the power through the variators and with the first and second compound member branches interrupted;

all such that the transmission of power is in a series-hybrid mode.

8. The process according to claim 7 wherein the planetary units are organized about a common axis.

9. A transmission according to claim 7 wherein the compound-split mode has a low speed node in which no transfer of power occurs between the variators and the transmission transitions between the compound-split mode and the output-split mode at the low speed node.

10. A transmission comprising:

a first planetary unit (U1) including a sun member (S1), a ring member (R1) located around the sun member (S1), planets (P1) located between the sun member (S1) and ring member (R1), and a carrier member (C1) coupled to the planets (P1) and providing axes about which the planets (P1) may revolve;

a second planetary unit (U2) including a sun member (S2) a ring member (R2) located around the sun member (S2), planets (P2) located between the sun member (S2) and the ring member (R2) and a carrier member (C2) coupled with the planets (P2) and providing axes about which the planets (P2) may revolve;

a first variator (V1);

a second variator (V2) connected to the first variator (V1) so that power may transfer between the two variators (V1) and (V2);

an input (I) at which power is introduced into the transmission;

an output (O) at which power is delivered from the transmission; and a first clutch (16) between a member of the first planetary unit (U1) and a member of the second planetary unit (U2) for engaging and disengaging those members;

a first brake (18) for retarding rotation of one of the members disengaged by the clutch (16); and a second clutch (20) between a different member of the first planetary unit (U1) and a different member of the second planetary units (U2);

a second brake (22) for retarding rotation of one of the members disengaged by the second clutch 20;

the transmission being capable of operating in a compound-split mode wherein a member of the first planetary unit (U1) and a member of the second planetary unit (U2) are joined together to form a first compound member branch, wherein another member of the first planetary unit (U1) is connected to another member of the second planetary unit (U2) to form a second compound member branch in which the first clutch (16) is located, thus leaving one of the members of the planetary units (U1) unattached to a member of the planetary unit (U2) to form a first single member branch and another member of the planetary unit (U2) unattached to another member of the planetary unit (U1) to form a second single member branch, wherein the variator (V1) is connected to the second compound member branch, wherein the variator (V2) is connected to one of the single member branches, wherein the output (O) is connected to the first compound member branch, wherein the input (I) is connected to the other single member branch and wherein the first clutch (16) is engaged and the first brake (16) released;

the transmission also being capable of operating in an output split mode wherein it is the same as the compound split mode, except that the clutch (16) disengages the members of the second compound member branch while leaving one of the members of that branch still connected to the first variator (V1) and the brake (28) is applied to retard rotation of the other member of that branch;

the transmission further being capable of operating in a series-hybrid mode wherein it is the same as the output split mode, except that the second clutch (20) is disengaged and the second brake (22) applied, leaving all of the power to be transferred through the variators (V1, V2) and causing flue output (O) to rotate in the direction opposite to the direction that it would otherwise rotate;

the configuration of the transmission being selected from a group of consisting of any one of the following:

S1S2(V1)-C1C2(O)-R1(I)-R2(V2)
S1S2(O)-C1C2(V1)-R1(V2)-R2(I)
R1R2(V1)-C1C2(O)-S1(I)-S2(V2)
R1R2(O)-C1C2(V1)-S1(V1)-S2(I)
S1R2(V1)-C1C2(O)-R1(I)-S2(V2)
S1R2(O)-C1C2(V1)-R1(V2)-S2(I)
S1S2(O)-C1(I)-C2(V2)-R1R2(V1)
S1S2(V1)-C1(V2)-C2(I)-R1R2(O)
S1R2(O)-C1(I)-C2(V2)-R1S1(V1)
S1R2(V1)-C1(V2)-C2(I)-R1S2(O)
S1(I)-C1S2(O)-R1C2(V1)-R2(V2)
S1(V2)-C1S2(V1)-R1C2(O)-R2(I)
S1(I)-C1R2(O)-R1C2(V1)-S2(V2)
R1(I)-C1S2(O)-S1C2(V1)-R2(V2)

wherein dashes in the groups isolate connected components, parenthesis enclose a component that is not part of a branch, yet is connected to a branch, and italics denote a member of the second compound member branch that is disengaged from another member of that branch and its rotation restricted when the first clutch (16) is disengaged and the first brake (18) is applied.

11. A transmission according to claim 10 wherein each variator (V1, V2) is an electrical machine capable of functioning both as a generator and a motor.

12. A transmission according to claim 10 wherein each variator (V1, V2) is a hydraulic machine capable of functioning both as a pump and a motor.

13. A transmission according to claim 10 wherein the first and second planetary units (U1, U2) are organized about the same axis (X).

14. The process according to claim 10 and further comprising transmitting between the compound-split mode and the output-spilt mode at the lower node.

* * * * *

UNITED STATES PATENT AND TRADEMARK OFFICE
CERTIFICATE OF CORRECTION

PATENT NO.  : 6,964,627 B2
DATED       : November 15, 2005
INVENTOR(S) : Xiaolan Ai and Terry W. Mohr It is certified that error appears in the above-identified patent and that said Letters Patent is hereby corrected as shown below:

Column 1,
Line 51, replace "modem" with -- modern --.

Column 5,
Lines 47-62, delete the alphanumeric representations and substitute:

-- S1$S2$(V1) – C1C2(O) – R1(I) – R2(V2)
S1S2(O) – $C1$C2(V1) – R1(V2) – R2(I)
R1$R2$(V1) – C1C2(O) – S1(I) – S2(V2)
R1R2(O) – $C1$C2(V1) – S1(V2) – S2(I)
S1$R2$(V1) – C1C2(O) – R1(I) - S2(V2)
S1R2(O) – $C1$C2(V1) – R1(V2) –S2(I)
S1S2(O) – C1(I) – C2(V2) – R1$R2$(V1)
$S1$S2(V1) – C1(V2) – C2(I) – R1R2(O)
S1R2(O) – C1(I) – C2(V2) – R1$S2$(V1)
$S1$R2(V1) – C1(V2) – C2(I) – R1S2(O)
S1(I) – C1S2(O) – R1$C2$(V1) – R2(V2)
S1(V2) – $C1$S2(V1) – R1C2(O) – R2(I)
S1(I) – C1R2(O) – R1$C2$(V1) – S2(V2)
R1(I) – C1S2(O) – S1$C2$(V1) – R2(V2) --.

Line 66, replace "8" with -- S --.
Line 67, replace "respectivly" with -- respectively --.

Column 6,
Line 10, replace "identity" with -- identify --.
Line 14, replace "list" with -- that --.
Line 15, replace "parthesis" with -- parenthesis --.
Line 28, replace "S1R2(V1)" with -- S1$R2$(V1) --.
Line 32, replace "number" with -- member --.
Lines 36-37, replace "S1R2(V1)–C1C2(O)–R1(I)–S2(V2)" with
-- S1$R2$(V1)–C1C2(O)–R1(I)–S2(V2) --.
Line 54, replace "S1R2(V1)" with -- S1$R2$(V1) --.

UNITED STATES PATENT AND TRADEMARK OFFICE
CERTIFICATE OF CORRECTION

PATENT NO.    : 6,964,627 B2
DATED         : November 15, 2005
INVENTOR(S)   : Xiaolan Ai and Terry W. Mohr It is certified that error appears in the above-identified patent and that said Letters Patent is hereby corrected as shown below:

Column 10,
Line 7, replace "S1R2(O)–C1C2(V1)–RI(V2)–S2(I)" with
-- S1R2(O)–C$I$C2(V1)–R$I$(V2)–S2(I) --.
Line 16, replace "R1R2(VI)–C1C2(0)–S1(I)–S2(V)" with
-- R1R2(V1)–C$I$C2(0)–S1(I)–S2(V2) --.
Line 26, replace "R1R2(O)–C1C2(V1)–S1(V2)–S2(I)" with
-- R1R2(O)–C$I$C2(V1)–S1(V2)–S2(I) --.
Line 46, replace "until" with -- unit --.

Column 11,
Line 41, after "member" delete "of the".

Column 13,
Line 28, replace "units" with -- unit --.
Line 39, replace "(16)" with -- (18) --.

Column 14,
Line 6, delete "flue".
Line 11, after "group" delete "of".
Lines 12-25, delete the alphanumeric representations and substitute:

-- S1$S2$(V1) – C1C2(O) – R1(I) – R2(V2)
   S1$S2$(O) – $C1$C2(V1) – R1(V2) – R2(I)
   R1$R2$(V1) – C1C2(O) – S1(I) – S2(V2)
   R1R2(O) – $C1$C2(V1) – S1(V2) – S2(I)
   S1$R2$(V1) – C1C2(O) – R1(I) - S2(V2)
   S1R2(O) – $C1$C2(V1) – R1(V2) –S2(I)
   S1S2(O) – C1(I) – C2(V2) – R1$R2$(V1)
   $S1$S2(V1) – C1(V2) – C2(I) – R1R2(O)
   S1R2(O) – C1(I) – C2(V2) – R1$S2$(V1)
   $S1$R2(V1) – C1(V2) – C2(I) – R1S2(O)
   S1(I) – C1S2(O) – R1$C2$(V1) – R2(V2)
   S1(V2) – $C1$S2(V1) – R1C2(O) – R2(I)
   S1(I) – C1R2(O) – R1$C2$(V1) – S2(V2)
   R1(I) – C1S2(O) – S1$C2$(V1) – R2(V2) --.

UNITED STATES PATENT AND TRADEMARK OFFICE
CERTIFICATE OF CORRECTION

PATENT NO. : 6,964,627 B2
DATED : November 15, 2005
INVENTOR(S) : Xiaolan Ai and Terry W. Mohr It is certified that error appears in the above-identified patent and that said Letters Patent is hereby corrected as shown below:

<u>Column 14 (cont'd),</u>
Line 43, replace "transmitting" with -- transmission --.
Line 44, replace "output-spilt" with -- output-split --.

Signed and Sealed this

Twenty-third Day of May, 2006

JON W. DUDAS
*Director of the United States Patent and Trademark Office*